(12) United States Patent
Elliott

(10) Patent No.: US 6,473,097 B1
(45) Date of Patent: Oct. 29, 2002

(54) METHOD AND APPARATUS FOR PROVIDING A MOBILE SWITCHING CENTER INTRANET FUNCTION

(75) Inventor: Stephen Bennett Elliott, Allen, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/404,515

(22) Filed: Sep. 23, 1999

(51) Int. Cl.$^7$ .............................................. G06F 3/00
(52) U.S. Cl. ...................... 345/733; 345/740; 345/751; 709/201; 709/203
(58) Field of Search ................................ 345/733, 738, 345/739, 740, 751, 760, 854, 752, 846, 847; 707/501.1, 513; 709/201, 203

(56) References Cited

U.S. PATENT DOCUMENTS

| | | | | |
|---|---|---|---|---|
| 5,629,978 A | * | 5/1997 | Blumhardt et al. | 379/201 |
| 5,764,644 A | | 6/1998 | Miska et al. | |
| 5,867,494 A | * | 2/1999 | Krishnaswamy et al. | 370/352 |
| 5,881,059 A | * | 3/1999 | Deschaine | 370/337 |
| 5,896,568 A | | 4/1999 | Tseng et al. | |
| 5,905,726 A | | 5/1999 | Gupta | |
| 5,983,199 A | * | 11/1999 | Kaneko | 705/26 |
| 6,018,767 A | * | 1/2000 | Fijolek et al. | 709/218 |
| 6,188,683 B1 | * | 2/2000 | Lang et al. | 370/352 |
| 6,044,403 A | * | 3/2000 | Gerszberg et al. | 709/225 |
| 6,229,810 B1 | * | 5/2000 | Gerszberg et al. | 370/401 |
| 6,161,128 A | * | 12/2000 | Smyk | 709/205 |

OTHER PUBLICATIONS

Attorney Docket No. RR2341; App. No. 09/436,008, Related Co–Pending Application Stephen B. Elliott, et al., Filed Nov. 9, 1999.

Attorney Docket No. RR2332; App. No. 09/406,317, Related Co–Pending Application Stephen B. Elliott, Files Sep. 27, 1999.

Attorney Docket No. RR2344; App. No. 09/414,181, Related Co–Pending Application Stephen B. Elliott, et al., Filed Oct. 7, 1999.

Internet Telephony Terminology and Glossary, 1997 Internet Telephone Company, Inc., pp. 1–5, San Jose, California.

MCI, Next Generation Switch and Intelligent Network Asynchronous Transfer Mode Switched Virtual Circuit (NGS/NGIN ATM SVC) virtual Data network (Dnet), pp. 1–15, Second Draft, Jan. 28, 1998.

* cited by examiner

Primary Examiner—Raymond J. Bayerl
Assistant Examiner—Cuong T. Thai
(74) Attorney, Agent, or Firm—John D. Crane; Bracewell & Patterson, L.L.P.

(57) ABSTRACT

The present invention installs an IP intranet functionality in a Mobile Switching Center for supporting wireless data and multimedia services within an operator community of interest. An IP network is introduced between a multimedia device and the Internet. The intranet provides a subnetwork and service context for wireless telco operators. Upon initiation of a service session by a multimedia terminal, the Mobile Switching Center presents the subscriber with an operator "intranet homepage" that serves as the primary navigator and launch pad for traversing the operator intranet or for launching a session on the Internet. If the initiating device is a voice only terminal, the Mobile Switching Center enables connection to another voice only terminal as usual.

22 Claims, 11 Drawing Sheets

METHOD AND APPARATUS FOR PROVIDING A MOBILE SWITCHING CENTER INTRANET FUNCTION

RELATED APPLICATIONS

The present application is related to the subject matter of the following applications: Ser. No. 09/436,008 entitled "Method and System for Providing an Integrated Functional Topology for Wireless and Wireline Communication Networks" and filed Nov. 9, 1999; Ser. No. 09/406,317 entitled "Integration of ATM Edge Switch with Access Device" and filed Nov. 27, 1999; Ser. No. 09/414,181 entitled "Method and System for Next Generation Wireless Network Access Function" and filed Oct. 7, 1999. The content of the above-referenced applications is incorporated herein by reference.

BACKGROUND OF THE INVENTION

1. Technical Field

The present invention relates in general to Internet and data communication via mobile telephone communications and in particular to interfacing between a wireless subscriber and the Internet. More particularly, the present invention relates to an Internet Protocol interface between a wireless subscriber and the Internet.

2. Description of the Related Art

The written description utilizes a large number of acronyms to refer to components, methods and services. Although known, for purposes of this discussion and convenience for the reader, acronyms will be defined as follows:
Base Station Controller ("BSC")
Base Transceiver Station ("BTS")
Circuit InterWorking Function ("CIWF")
Internet Protocol ("IP")
Internet Service Provider ("ISP")
Local Exchange Carrier ("LEC")
Mobile Switching Center ("MSC")
Mobile Data Interface System ("MDIS")
Signal Control Point ("SCP")
Signal Transfer Point ("STP")
Time Division Multiplex ("TDM")
Transmission Control Protocol ("TCP")
Point of Presence ("POP")
Public Switched Telecommunication Network ("PSTN")

For the purposes of this application, the term "subscriber" is used to mean a subscriber to a telephone service and generally refers to the party initiating a call. Subscriber and "user" may be used interchangeably throughout this application. In wireless, a subscriber is the party in possession of the "handset"—the portable voice communications device. The term "subscriber" may encompass both business and residential users. Also, the term "off-hook" means the handset or other wireless device is available to receive or send wireless signals.

BACKGROUND ART

The World Wide Web is a convention for linking together text documents, interactive programs and images over the Internet. Internet addresses and links (icons or text on an Internet web page representing Internet web sites) utilizing HyperText Markup Language ("HTML") provide the navigation means between sites on the internet. The communication protocol employed by the internet via telephone communication devices is Transmission Control Protocol/ Internet protocol ("TCP/IP"). An intranet, as opposed to the Internet, is a discreet IP network serving a community of interests that provides a method of distributing information between different Personal Computers ("PC") within a company, i.e., a Local Area Network: ("LAN") or Wide Area Network ("WAN").

An intranet is similar to the Internet's World Wide Web ("Web") in that it usually employs a browser client that will operate satisfactorily on the internet and within the company's intranet. An intranet may be limited to company wide access, with and typically has provisions for various levels of security for different intranet sites within the company. Also, the company may provide a website on the Internet, that with the appropriate authority will allow outsiders to access internal intranet sites. Some intranets are on a much larger scale and more closely related to Internet usage. For example, America On Line™ ("AOL") of Dulles, Va., maintains a gateway (portal or entry) to the Internet and provides access to content on AOL servers. Entry to the Internet through AOL is limited to subscribers to AOL. Additionally, AOL generated content (databases, files, applications, etc.) is available only to AOL subscribers. Various databases are available for additional fees and are accessed only by providing a password. A subscriber then has access to the AOL "intranet."

TCP/IP is the communication protocol required to operate on the Internet and on individual company intranets. As with Internet websites, intranet sites provide content accessible by authorized users in the form of text, graphics and applications. Each site, or workstation, on an intranet has an IP address permanently assigned by the network administrator. The address is accessible by intranet browser client and is usually capable of: displaying a webpage provided by the intranet site, retrieving documents, searching for data on the site, retrieving (downloading) applications, accessing databases, communicating in real time with co-workers via keyboard entry or video/audio, etc. Generally, as with the Internet, the communication between browser and site is accomplished, utilizing telephony communications via a wire circuit. Circuit is a term for the network that telephone communications travel over including wire, optical fibre or microwave, usually via telephone wireline switches.

In the circuit world, Internet and data communications, in general, bypass the wireline switch and are siphoned off to other service providers, limiting the role of circuit operators to "access" providers. An access provider, in this instance a circuit or wireless operator, would provide connection to an Internet Service Provider ("ISP") that would in turn connect a subscriber to the global Internet. A circuit operator is the traditional telephone service provider utilizing cable or wires to provide telephone communication service. A wireless operator provides telephone service via radio frequency without the use of cable.

Traditionally, access to the Internet is usually accomplished by a browser client operating on a computer via modem through circuit (telephone company) services. A user activates the browser client (application) on the user's computer and clicks on an icon to make connection to the Internet. The browser activates a modem connected to the computer and the modem dials the phone number of an ISP. Connection is made through a local telephone company switch via circuit (copper cable) to an Internet gateway, in this example an ISP. A modem at the ISP makes connection with the user's modem and routes connects the user computer to the Internet through the modems and the circuit service.

An ISP usually has many incoming telephone lines and more customers than telephone lines. Circuit service charges to the ISP are based on the number of lines and type of service provided and due to the number of ISPs, the ISP may operate in an area not served by the user's circuit operator. Also, with the advent of Internet telephony, utilizing the Internet to make long distance telephone calls at very low rates will become more commonplace. Long distance carriers will be bypassed as more and more long distance calls are made via the Internet, increasing revenue to the ISP and decreasing revenue to the long distance carriers.

Figure 7:
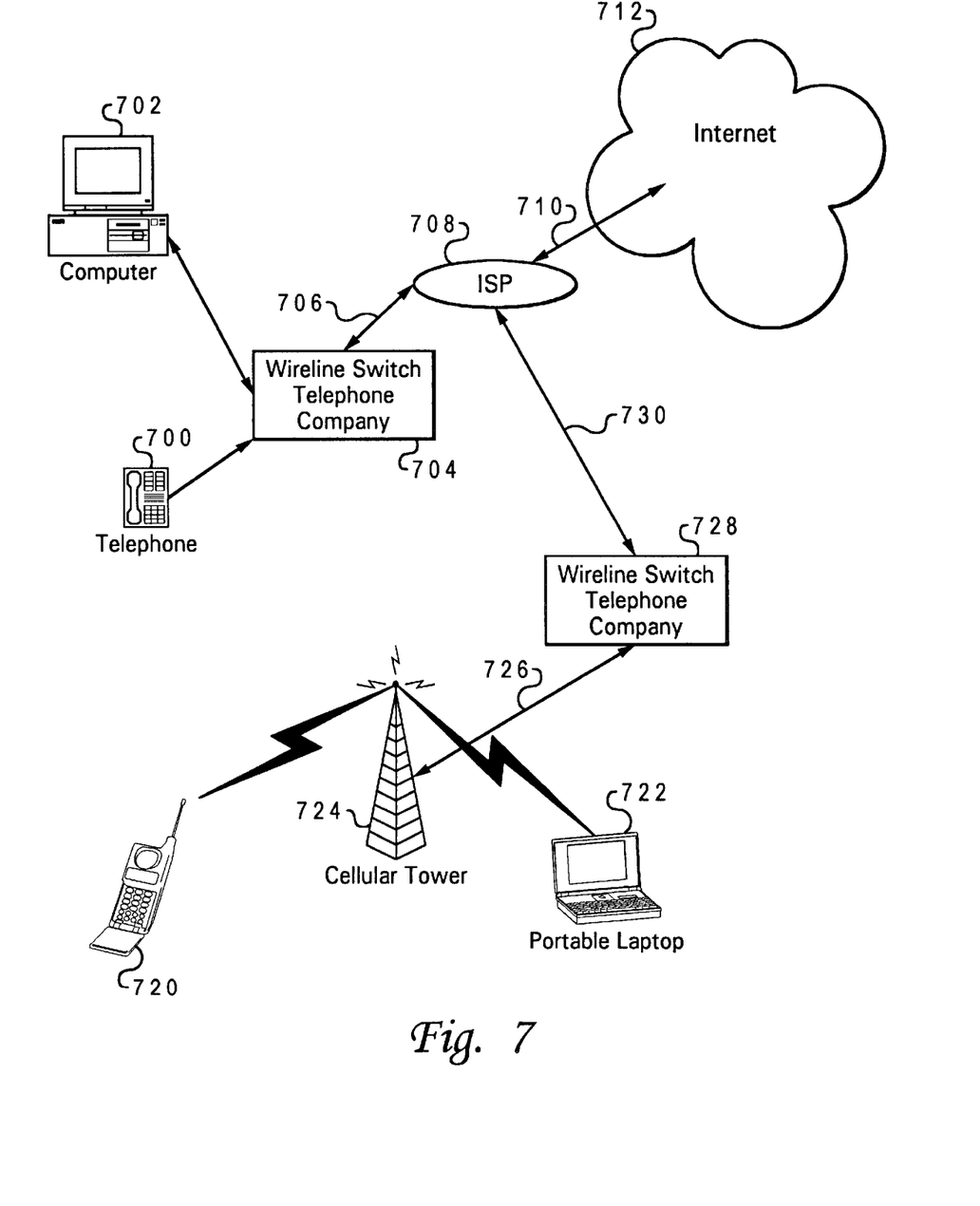
FIG. 7 depicts a high-level block diagram of known methods of connecting to the Internet.

Referring to FIG. 7, a high-level diagram of Internet access by subscribers/customers, is depicted. Telephone 700 represents a residential subscriber telephonic connection to a local circuit telephone provider 704 and computer 702 represents a data communications connection to the provider 704 via circuit based telephone company ("telco"). Normally, because of the graphical interface, the only useful connection to the Internet 712 has been through use of a computer utilizing a modem to communicate through the provider 704. Recently, devices have been introduced that will allow communication, long distance, by the subscriber's telephone over Internet 712 to another circuit based subscriber telephone (not shown).

Communication transpires between subscriber's computer 702 utilizing a modem (not shown) and the Internet 712 via wire connection between the subscriber and telephone company ("telco") 704. A communication from computer 702 is connected to ISP 708, typically, via wire 706. The communication is received into an ISP server (not shown), and the connection sets up communications between the computer 702 and ISP 708. ISP 708 makes connection to Internet 712 usually via a "backbone" (broad bandwidth communications link) 710. Backbone 710 transmits commands generated by subscriber's computer 702 for navigating and accessing websites on the Internet 712.

A wireless operator, represented by tower 724, provides access in a similar fashion to Internet 712 by connecting a subscriber's laptop computer 722 or cell phone 720 via Telco 708. Connection 703 is replaced by radio frequency transmission 723, but the circuit from wireless operator 724 to Internet 712 remains the same. The communication is sent via circuit 726 to Telco 728 and connected to ISP 708. ISP 708 makes connection to Internet 712 as described above. Unless wireless operator 724 is the same as Telco 728, access and use charges are assessed to wireless operator 724 and usually passed to the subscriber.

Figure 8:
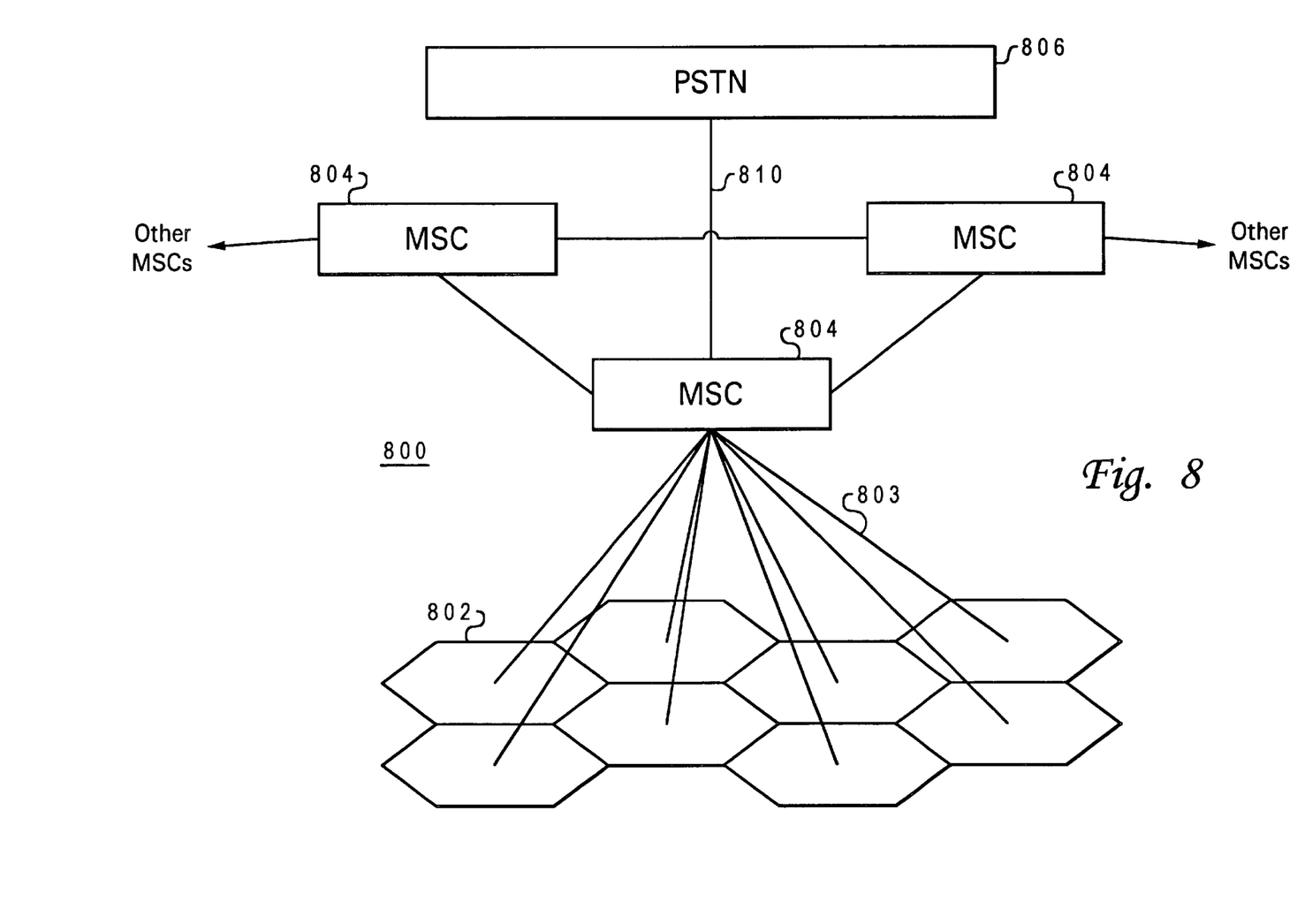
FIG. 8 illustrates a high-level block diagram of a wireless communications system.

FIG. 8, depicts a high-level block diagram of a cellular network. Cellular network 800 comprises numerous defined land areas termed "cells" in which subscribers may send and receive radio transmissions to network 800. Individual cells 802 represent multiple cellular communications towers serviced by Mobile Switching Center ("MSC") 804. The communications path, from cell 802 to MSC 804, of a call by a mobile subscriber (not shown) to a circuit telephone or other mobile subscriber is represented by radio links 803. Communication with a circuit based telephone is accomplished by MSC 804 interfacing with and transferring a call to the Public Switched Telecommunication Network ("PSTN"). Calls from a circuit based telephone to a cellular telephone are completed in a reverse fashion.

As the mobile subscriber moves between cells, MSC 804 "hands off" the subscriber to each subsequent cell. If the subscriber travels out of MSC 804 effective area, the subscriber is handed off to another, adjacent MSC 804. MSC 804 is notified by the subscriber's handset when the subscriber moves into a cell operated by MSC 804 as long as the handset is powered on. If the handset is turned on within a cell, notification by the handset is sent automatically to MSC 804 who the subscriber is and the cell in which the handset is presently located.

Bypassing a telco operator to access the internet continues to be a very large problem in the wireline industry in that this traffic ties up physical resources and generates little or no service revenue. More seriously, once bypassed, the opportunity for wireline operators to provide services to that subscriber is lost.

Wireless data, multimedia, and access to the Internet via wireless are in their infancy. Wireless technology has advanced to the point though, that data transmission via wireless modem is becoming commonplace, thus allowing for wireless computing and wireless connection to the Internet. However, bypassing the operator is a problem in the wireless industry as well. A subscriber (user) utilizes a laptop computer to access a wireless operator via wireless modem. The modem dials the number of an ISP and directly connects to the Internet via the ISP, though acting as a conduit, the services revenue bypasses the wireless operator. There are wireless and wireline operators that are also ISPs and thus are able to capture the subscriber's initial call in. However, unlike the large intranet-like provider America On Line, a telco operator usually supplies a connection (or conduit) to the Internet and most subscribers bypass services available from the telco operator.

It would be desirable therefore, to provide a method and apparatus that would provide wireline and wireless operators an opportunity to capture and retain subscriber revenue that would otherwise go to an ISP. It would further be desirable to provide a method and apparatus that would be user friendly and easy to install on the operator's current system. Additionally, it would be desirable to provide a method and apparatus that provides an interface that may be easily modified by a telco operator.

SUMMARY OF THE INVENTION

It is therefore one object of the present invention to provide a method and apparatus for that would provide wireline and wireless operators an opportunity to capture and retain subscriber revenue that would otherwise go to Internet Service Providers.

It is another object of the present invention to provide a method and apparatus that allows additional opportunities for the operator to provide direct access to the Internet.

It is yet another object of the present invention to provide a method and apparatus that allows an operator to provide additional content that may generate additional revenue.

The foregoing objects are achieved as is now described. The present invention installs an IP intranet functionality in a Mobile Switching Center for supporting wireless data and multimedia services within an operator community of interest. An IP network is introduced between a multimedia device and the Internet. The intranet provides a subnetwork and service context for wireless telco operators. Upon initiation of a service session by a multimedia terminal, the Mobile Switching Center presents the subscriber with the operator "intranet homepage" that serves as the primary navigator and launch pad for traversing the operator intranet or for launching a session on the Internet. If the initiating device is a voice only terminal, the Mobile Switching Center enables connection to another voice only terminal as usual.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
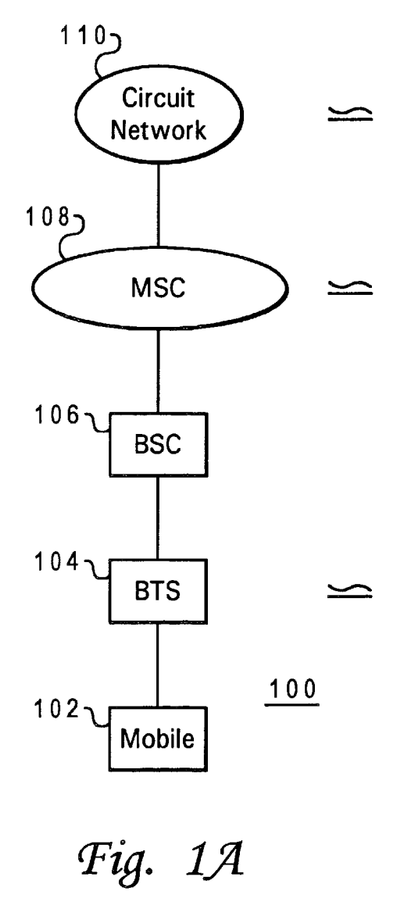
FIGS. 1A–1B depicts high-level block diagrams comparing a regular analog wireless system to a digital packet based system in which a preferred embodiment of the present invention may be implemented.
Figure 1B:
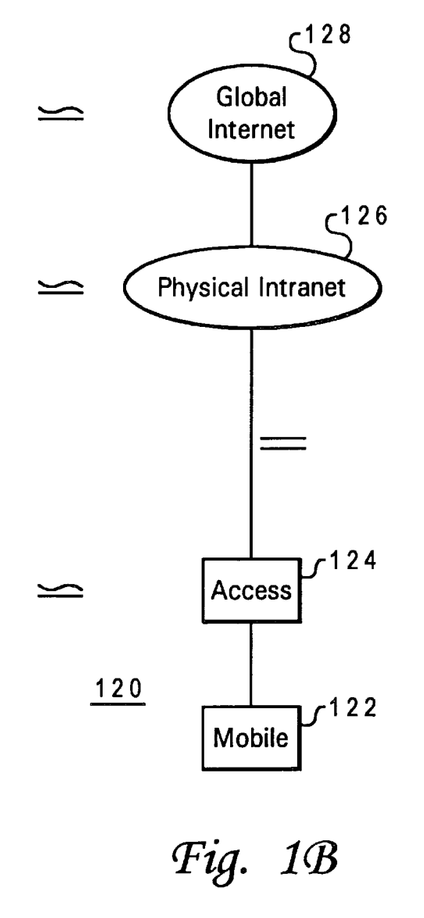

With reference now to the figures, and in particular with reference to FIGS. 1A and 1B, high-level block diagrams comparing a regular analog wireless system to a digital packet based system in which a preferred embodiment of the present invention may be implemented, is depicted.

FIG. 1A demonstrates a channeled, digital infrastructure, system 100 that carries all communication traffic. A communication session utilizing system 100 to connect with the Internet, another mobile laptop, a central office computer, etc., is illustrated in FIG. 1A. Beginning with mobile 102, which represents a mobile laptop computer with a wireless modem, a wireless call is placed and received by Base Transceiver Station ("BTS") 104. BTS 104 then transmits the call to Base Station Controller ("BSC") 106 which manages radio resources and BTS 104 within a specified group of cells in the Public Land Mobile Network.

Subsequently, the call is sent to Mobile Switching Center ("MSC") 108 which provides service logic, circuit Connection point, Home Location Register ("HLR"), Visitor Location Register ("VLR"), etc. MSC 108 then sends the call to the circuit network where network based services and routing are provided utilizing Signal Control Point ("SCP") and Signal Transfer Point ("STP").

FIG. 1B is a configuration of the present invention that would be roughly equivalent to the configuration shown in FIG. 1A. An essential difference is the topology of the networks. Whereas, communication topology in the hierarchy depicted in FIG. 1A employs circuit (Time Division Multiplex) based transmission; communication in the present invention employs packet based transmission. A communication may be initiated in system 120 by mobile laptop 122. It accesses system 120 by wireless modem (not shown) through Access 124 which is roughly equivalent to BTS 104 of FIG. 1A. A Point of Presence ("POP"), which provides a direct connection to an operator's physical intranet 126, is contained within Access 124. Intranet 126 is roughly equivalent to MSC 108 in FIG. 1A. Intranet 126 is comprised of Local Area Networks, routers and servers, much as any other intranet.

Intranet 126 serves as a gateway to the Internet or makes normal connections as the circuit network would when dialing non-Internet telephone numbers. Intranet 126 connects a subscriber to Internet 128 utilizing various installed servers connected to the Internet 128, usually, via a high speed network known as a "backbone".

The present invention utilizes a graphical interface at the POP for "capturing" a subscriber. This interface allows the operator to provide multiple services, including connection to the Internet. As a subscriber device enters a cell serviced by MSC Intranet, the MSC recognizes the presence of the device and initiates the registration process. As the device moves into a cell, the registration and authentication process for the device occurs. Even though the example depicts a computer making connection, advancing technology on wireline and wireless phones displays for telephones are being introduced that will allow telephonic Internet browsing.

Figure 1C:
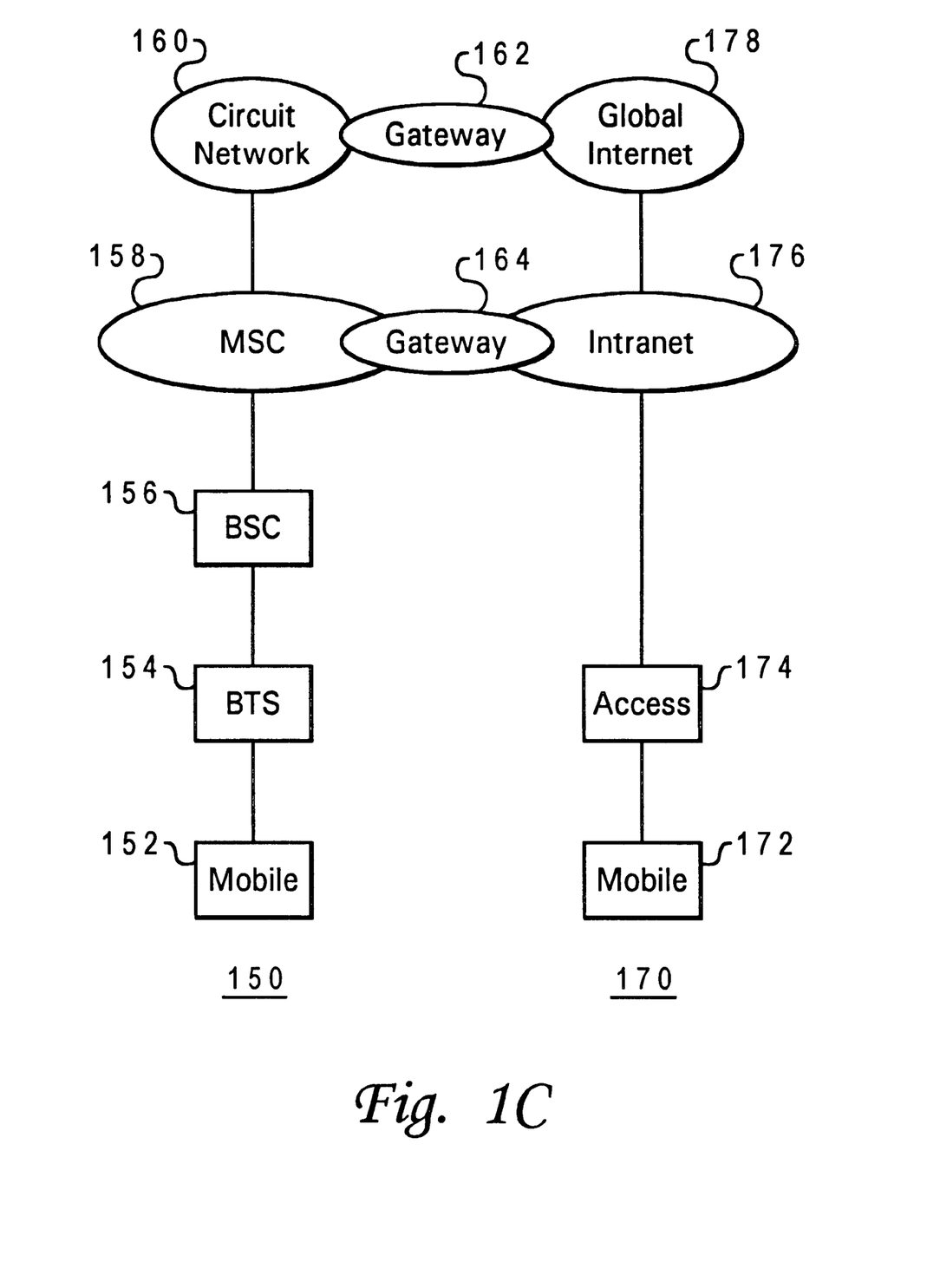
FIG. 1C illustrates a high-level block diagram of a regular analog wireless system with gateway connections to a digital packet based system in accordance with a preferred embodiment of the present invention.

Referring now to FIG. 1C, a high-level block diagram of a regular analog wireless system with gateway connections to a digital packet based system in accordance with a preferred embodiment of the present invention, is illustrated. Beginning with system 150, a standard, circuit based wireless system may connect circuit subscriber 152 to a telco system based on the present invention. The method of making a connection to the Internet provides different ways to connect to Internet 178, for example. In this example, system 150, a standard wireless system, could connect to packet based system 170 and access Internet 178. A standard wireless system would connect circuit subscriber 152, as discussed in FIG. 1A, up to and including the MSC 158. At this point if the operator of wireless TDM system 150 has installed a gateway to packet system 170, the call may be routed to Intranet 176 via gateway 164. The call would further be routed to operator provided content or operator services within intranet 176 or on to Internet 178. Additionally, circuit subscriber 152 on a circuit based system could connect with circuit subscriber 152 on packet system 170. Voice mail, email, fax services; all could be utilized by circuit system 150 via gateways 162 and 164. Wireless subscriber 172 could contact circuit subscriber 152 in circuit system 150 network utilizing the operator provided interface (not shown) and connect via Access 174 and intranet 176 through gateway 164 or, via Internet 178 through gateway 162 (long distance, email, etc.).

Figure 2:
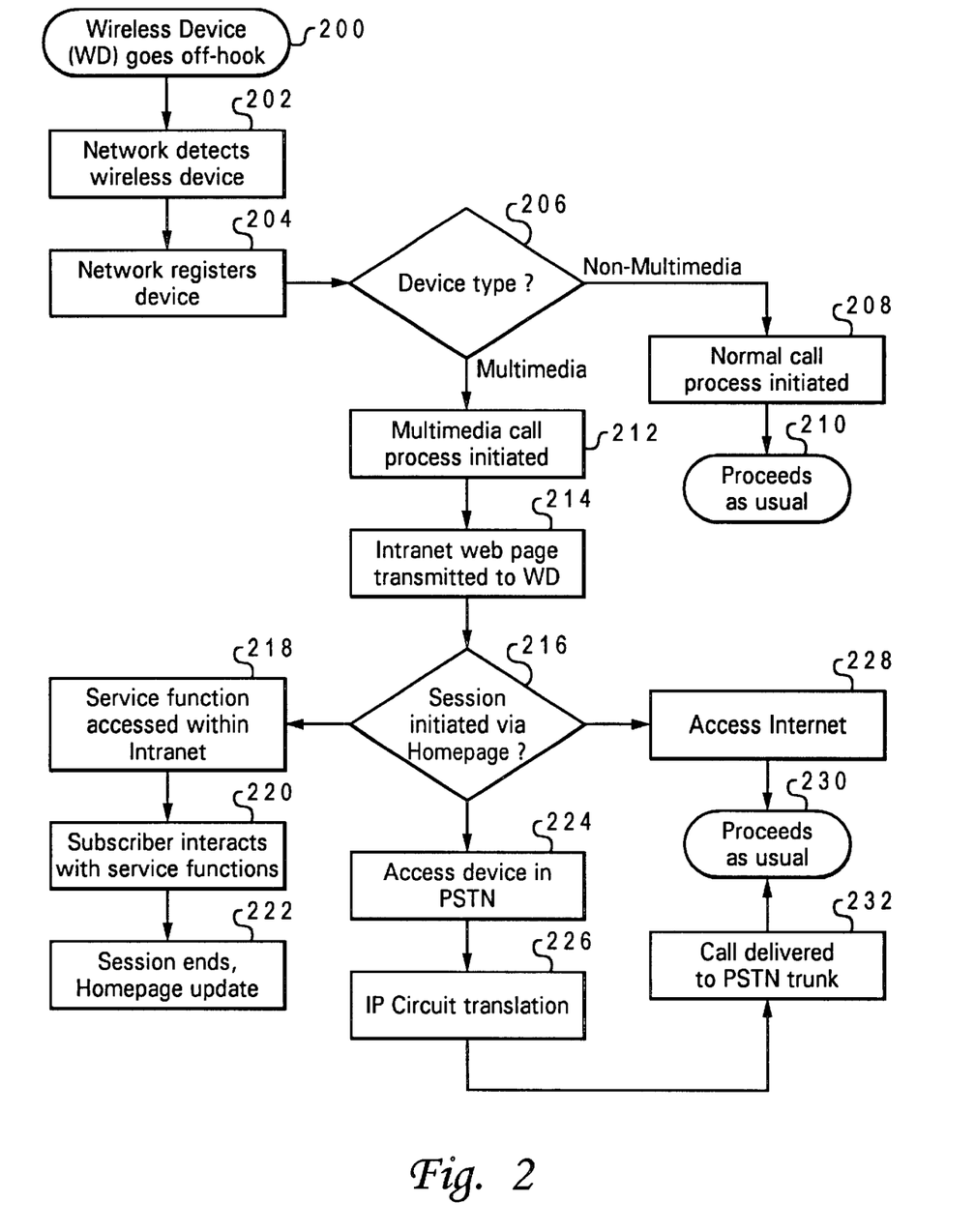
FIG. 2 depicts a high-level flow chart of the process for providing an intranet interface to a wireless subscriber in accordance with a preferred embodiment of the present invention.

Referring now to FIG. 2, a high-level flow chart of the process for providing an intranet interface to a wireless subscriber in accordance with a preferred embodiment of the present invention, is depicted. The process begins with step 200, which depicts a wireless device (i.e., laptop, cellphone, etc.), within a wireless network, powering up or roaming into the Radio Frequency ("RF") environment of the cellular system. The process proceeds to step 202, which illustrates the wireless network detecting the wireless device (WD). The process then passes to step 204, which depicts the network registering and authenticating the identity of the wireless device.

The process continues to step 206, which is a determination of the type of wireless device. If the device detected is a normal device (non-multimedia capable), the process proceeds to step 208, which depicts a call by the wireless device being received by the network and call processing logic being initiated. The process next passes to step 208, which illustrates the call proceeding in a normal fashion. If the device type is determined by the network to be a multimedia device, the process instead, proceeds to step 212, which depicts multimedia call processing being initiated. The process then proceeds to step 214, which illustrates the telco operator's "Homepage" (intranet entry web page) being transmitted to the multimedia device.

The process passes to step 216, which depicts the Homepage being displayed on the terminal of the subscriber's multimedia device. The subscriber is presented with multiple choices to pick from. Three major categories are displayed with multiple subcategories. The three major categories are: utilizing the telco operator's intranet, access a device on the PSTN and access the Internet via the Homepage.

If the subscriber chooses to operate within the telco operator's intranet, the process passes to step 218, which illustrates the subscriber accessing one of many service functions available on the Homepage. Databases, advertisements, personal accounts, etc. may all be available to the subscriber. A personalized version of the Homepage could also be made available in response to an identifying signal sent when the subscriber signs on. After signing on the intranet, the process then proceeds to step 220, which depicts the subscriber interacting with various service functions available on the telco operator's intranet. The process continues to step 222, which illustrates the intranet session ending and any updates of the personalized Homepage being completed.

If the subscriber chooses instead to access the Internet via the Homepage, the process proceeds to step 228, which depicts the subscriber being routed to the Internet. Access to the Internet would be provided by the operator or linked to an ISP of the subscriber's choice. The process then passes to step 230, which illustrates the communication session proceeding normally as if there were no IP network between the subscriber and the Internet. By routing the customer to the Internet via the operator Homepage, the opportunity for the operator to capture advertising revenues, fee for services revenue, etc., becomes much more feasible than if there were no Homepage.

Returning to step 216, if the subscriber chooses to access a non-wireless device off the operator's network, the process proceeds instead to step 224, which depicts accessing a device in the PSTN. The process then proceeds to step 226, which illustrates the subscriber communication being translated for transmission to the PSTN utilizing an Interworking function within the operator's network. The translation may be from packet to TDM or from Code Division Multiple Access (CDMA) protocol to Time Division Multiple Access (TDMA) protocol or any other available protocol translation. Next the process passes to step 232, which depicts the translated call being delivered to the PSTN trunk. The process continues to step 230, which illustrates connection of the subscriber to the target device and completion of the communication.

A web page is presented to the user and if the user is utilizing a multimedia device, the user may to connect to: the PSTN, other wireless devices, individual links that connect to operator provided content, emergency numbers, Internet URLs, etc. Additionally, software tools may be provided so that the subscriber can modify the operator's Homepage display. The subscriber could add various links to the Homepage such as outside email, a personal telephone directory, direct telephone links, etc. The intranet interface affords the operator an opportunity to capture revenue that is currently going to other providers such as Local Exchange Carriers, ISP's, long distance carriers, etc.

Figure 3:
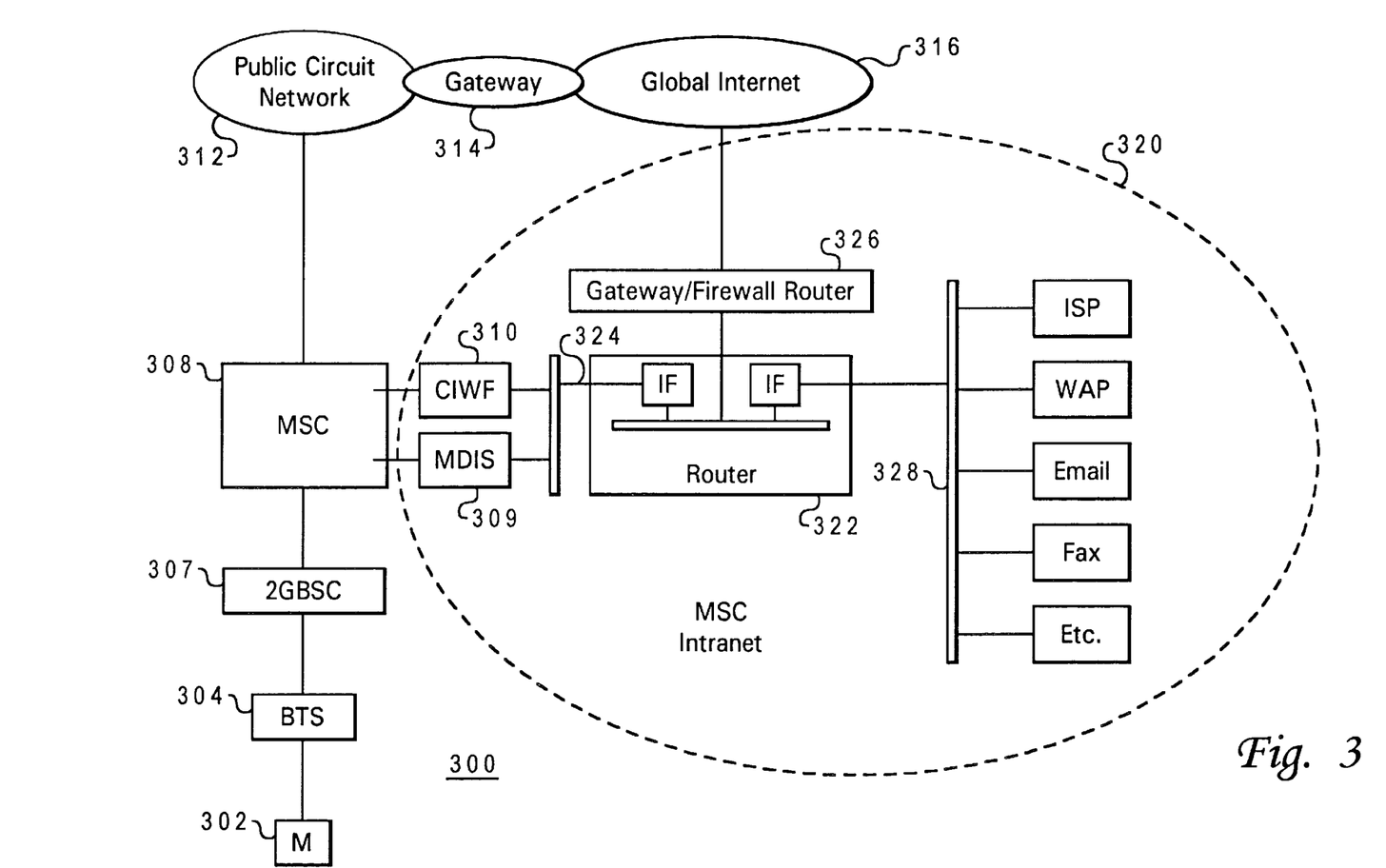
FIG. 3 illustrates a high-level block diagram of a data packet based MSC intranet in accordance with a preferred embodiment of the present invention.

Referring to FIG. 3, a high-level block diagram of a data packet based MSC intranet in accordance with a preferred embodiment of the present invention, is illustrated. System 300 is an IP packet based telecommunication system. M 302 represents the mobile (wireless) user connecting to BTS 304 and further connecting to an operator's network via the MSC 308. 2GBSC 307 is a Second Generation Base Station Controller ("2GBSC") interfacing with MSC 308. MSC 308 connects to operator intranet 320 via CIWF 310 and MDIS 309.

MSC 306 connects with intranet router 322, via CIWF 310 AND MDIS 309 ethernet link. Router 222 then routes any transmission from MSC 306 to server(s) 328 or to gateway 326. Server(s) 328, provide the user with the ability to send email, connect to the Internet through the user's ISP and send electronic faxes, etc., to electronic addresses. The user may connect to Internet 316 through intranet gateway 326 thus, enabling the operator to provide Internet access and retain revenue that might otherwise go to an ISP.

Alternatively, MSC 306 is normally capable of connecting M 302 directly to the public circuit network 312 and may do so in the preferred embodiment. As shown, gateway 314 may connect M 302 to Internet 316 via public circuit network 312. Additionally, users outside the operator's network may connect to M 302 via public circuit network 312 or through the operator MSC intranet 320.

Figure 4A:
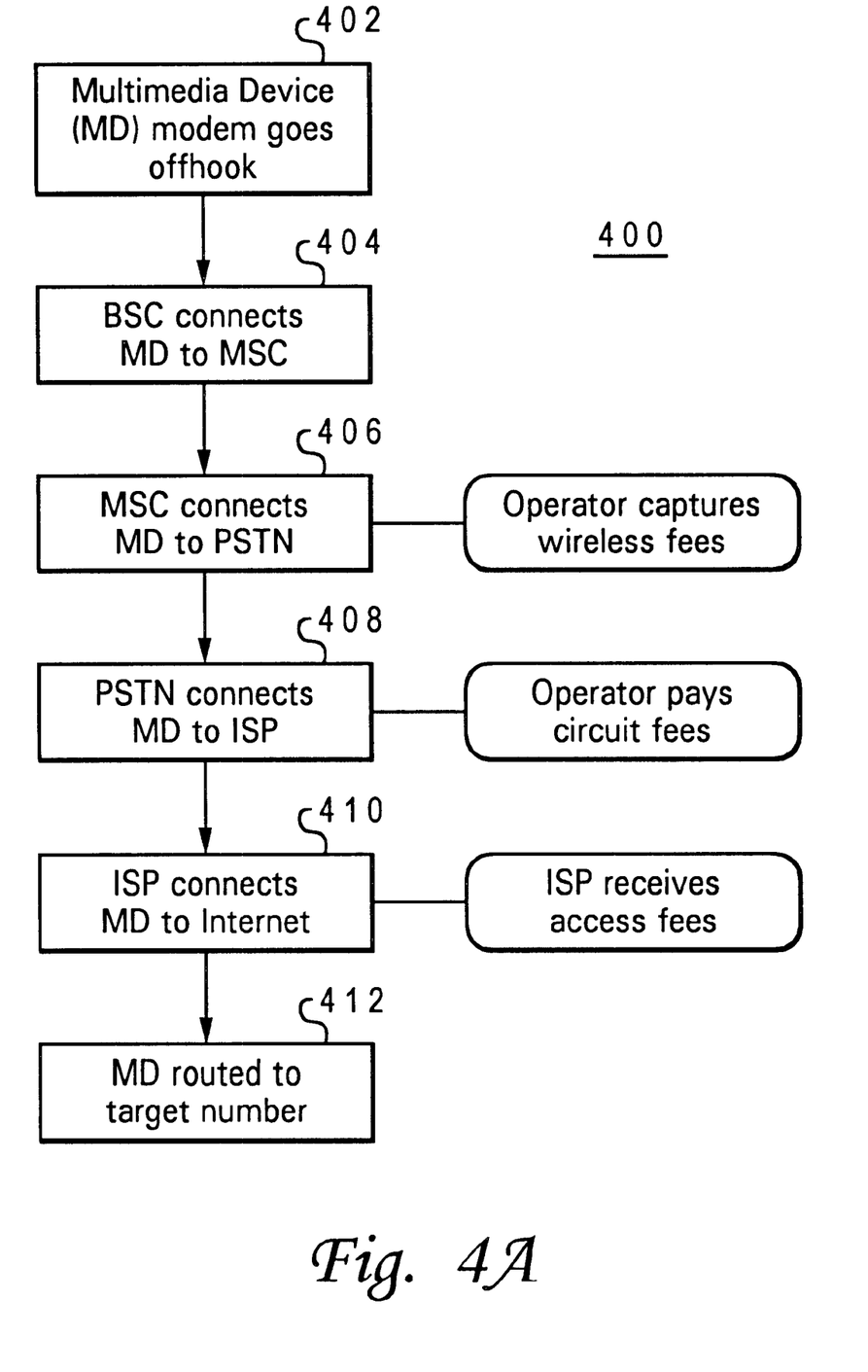
FIG. 4A depicts a high-level block diagram of a data packet based MSC intranet in accordance with a preferred embodiment of the present invention.

Referring now to FIG. 4A, a high-level flow diagram of revenue sources available when connecting a computer to the Internet, is depicted. Wireless system 400 receives a signal when a wireless modem, connected to a laptop, goes off-hook as depicted in step 402. The process then passes to step 404, which illustrates a BSC connecting the cellphone to the MSC. Next, the process passes to step 406, which depicts an MSC connecting the computer to the Public Switched Telecommunication Network. At this point the wireless operator begins charging the user for air time. The process continues to step 408, which illustrates the PSTN connecting the computer to an ISP. Circuit fees are charged to the operator for use of the PSTN circuit, which are included in the subscriber's fees. The process then passes to step 410, which depicts the ISP connecting the computer to the Internet. The ISP receives at least access fees from the subscriber and depending on the ISP's portal/web site, may have increased opportunities to increase revenue.

Figure 4B:
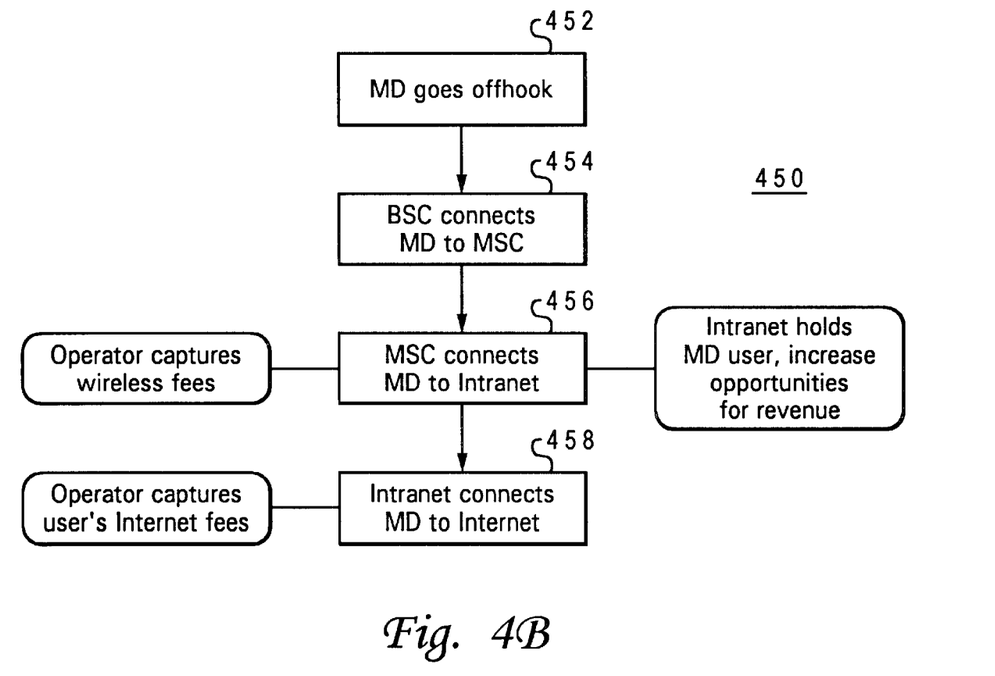
FIG. 4B illustrates a high-level flow diagram of sources of revenue in accordance with an embodiment of the present invention.

Referring to FIG. 4B, a high-level flow diagram depicting sources of revenue, in accordance with an embodiment of the present invention, is illustrated. The process begins n step 452, which illustrates a multimedia terminal ("MT") modem going off-hook. The process proceeds to step 454, which depicts a BSC connecting the MT modem to an MSC. Next the process passes to step 456, which illustrates the MSC connecting the MT to the web page on the operator's intranet. The operator is able to capture wireless fees for the connection and as shown previously in the conventional system.

The process continues to step 458, which depicts the intranet of the operator providing an Internet interface. The intranet can be a portal to the Internet, allowing the operator to reap some profits that would otherwise go into an ISP's pockets. Also, the web page may be used for advertising, providing links to popular sites and providing a menu allowing speech or fax communications utilizing IP transmission protocol. The operator gains an advantage by offering services that would ordinarily be offered by a third party ISP.

In summary, revenue that would ordinarily accrue to circuit services or to an ISP, may now be retained by a local wireline or wireless operator by incorporating the present invention into existing or new wireless or wireline systems.

Figure 5:
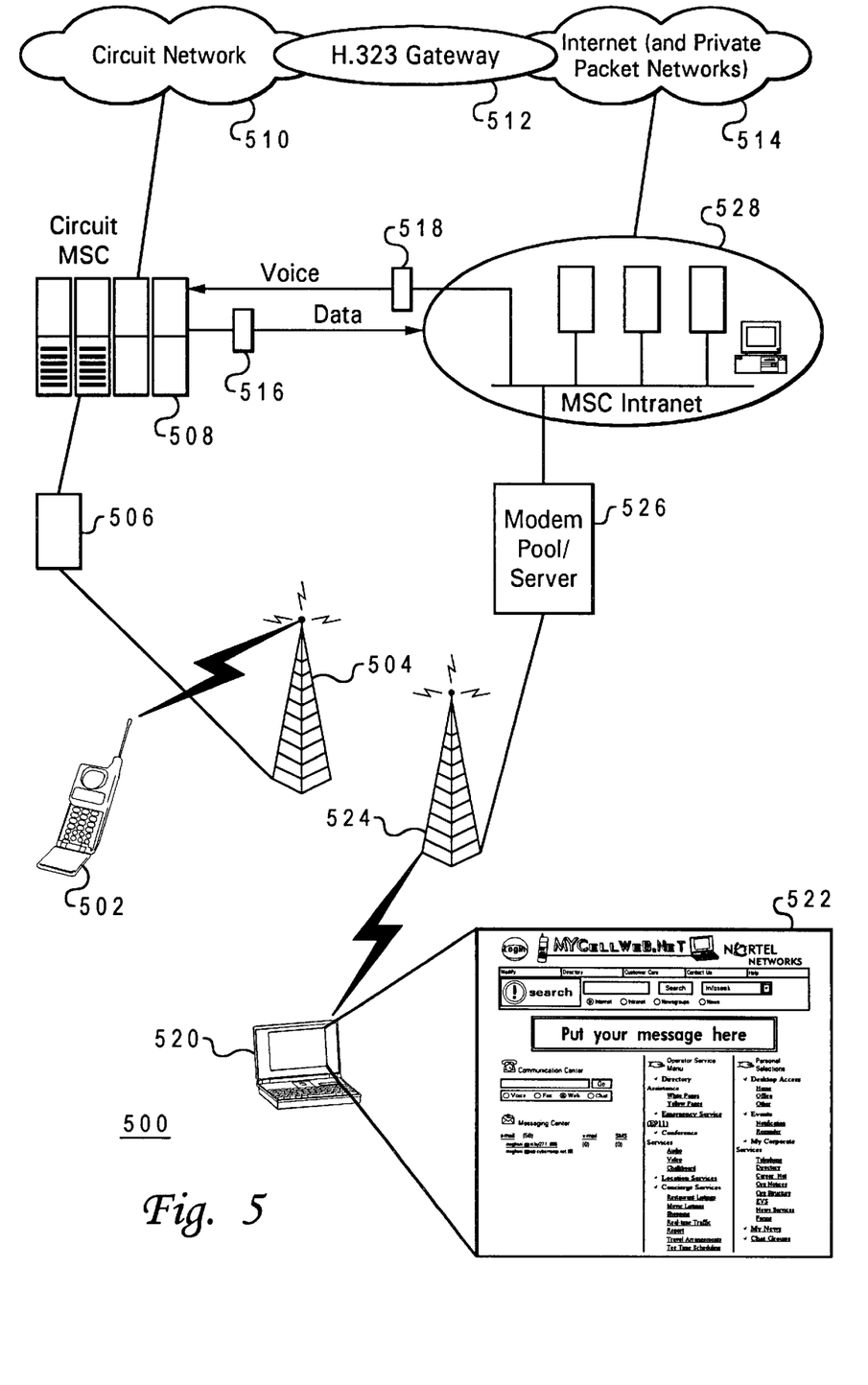
FIG. 5 is a high-level block diagram of a system in which a further preferred embodiment of the present invention may be implemented.

Referring to FIG. 5, a high-level block diagram of a system in which a further embodiment of the present invention may be implemented, is illustrated. System 500 comprises a wireless cellphone 502, which is represented as being in communication with MSC 508 via wireless tower 504 and BSC 506. MSC 508, is illustrated as capable of connecting with circuit network 510 and MSC intranet 528. A connection may be made to MSC Intranet 528 via H.323 gateway 512 and Internet 514. Also, data communication may be accomplished with the Internet via MSC intranet 528 server (not shown).

Figure 6:
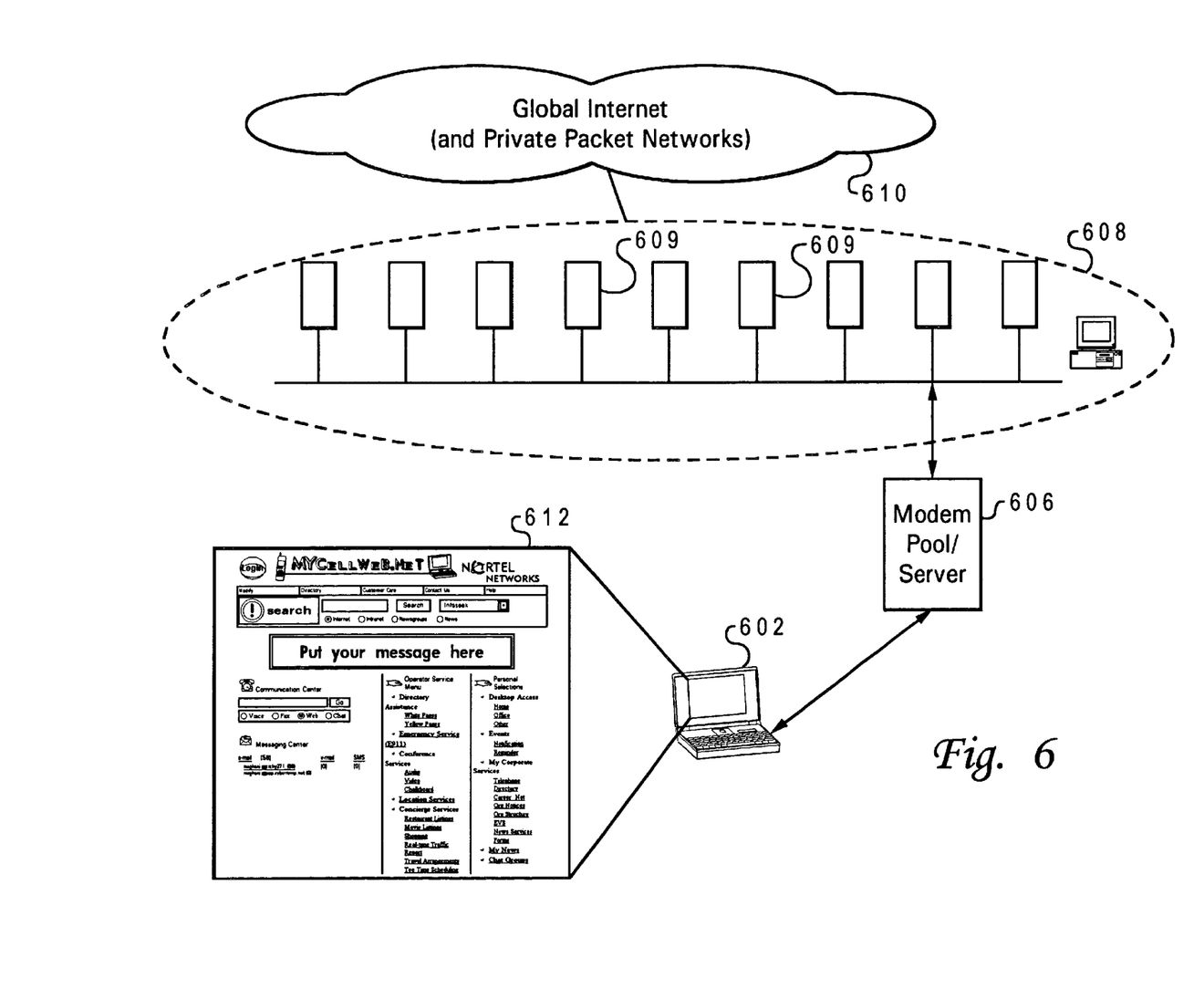
FIG. 6 illustrates a high-level block diagram of a fully integrated system in which a preferred embodiment of the present invention may be implemented.

Referring now to FIG. 6, a high-level block diagram of a fully integrated system in which a preferred embodiment of the present invention may be implemented, is illustrated. System 600 comprises multiple elements beginning with multimedia terminal 602. MT 602 may include a laptop computer, a handheld computer/organizer, a combination computer/wireless telephone, a wireless phone, a wireline connected computer, etc. MT 602 sends a signal to a telco operator with which the subscriber has an account and the signal is initially received by modem pool 606. Modem pool 606 transmits the signal to server 609 within telco network 608. Server 609 determines the ultimate destination of the transmission from MT 602. If MT 602 is a multimedia terminal capable of displaying an intranet web page, the server sends telco intranet web page 612 to MT 602. The user then interacts with web page 612 which may include faxing, accessing telco databases within telco intranet 608, dialing a telephone number for voice communication, transferring to the Internet and email messages.

Figure 9:
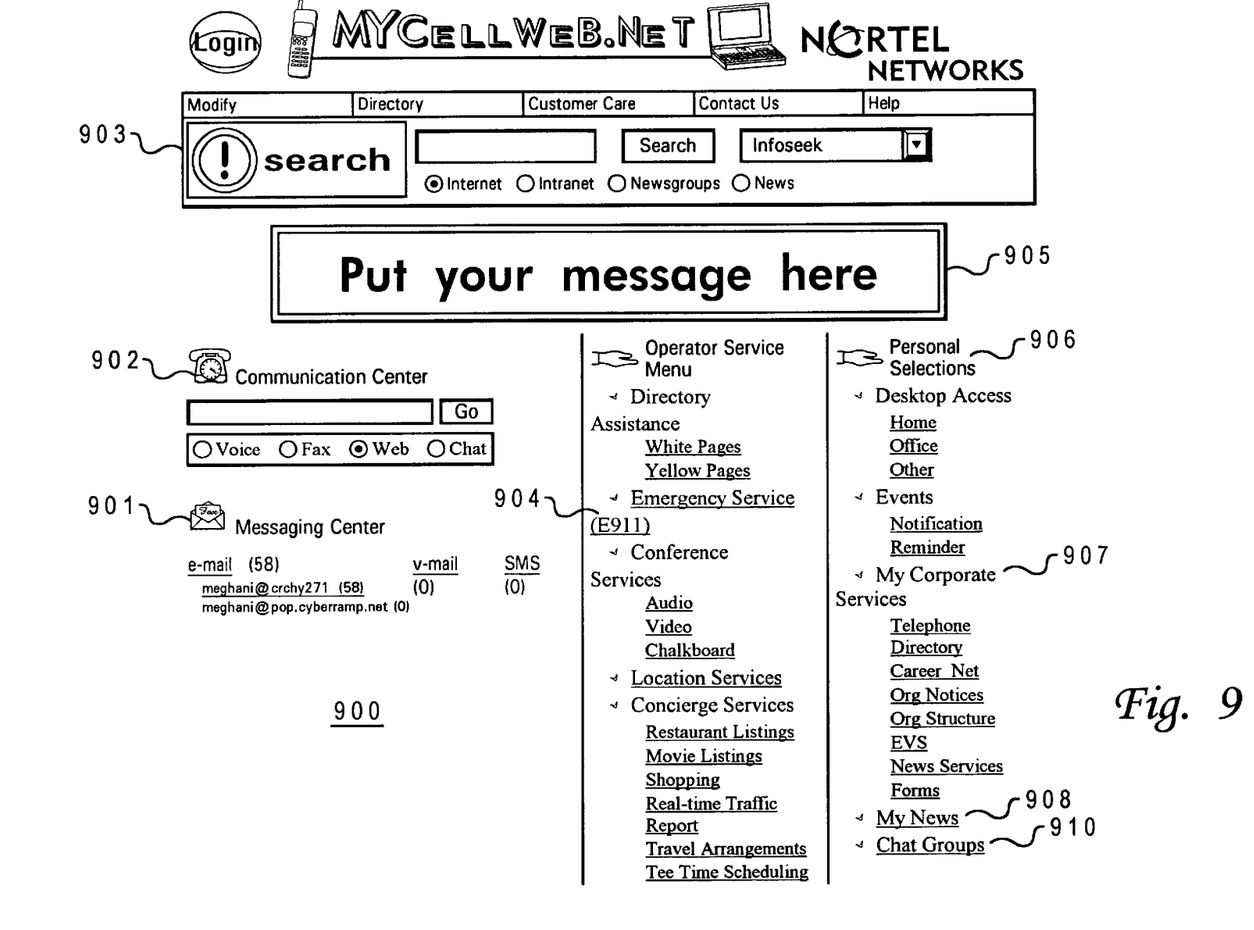
FIG. 9 depicts a homepage in accordance with the present invention.

Referring now, to FIG. 9, a homepage in accordance with the present invention is depicted. Homepage 900, may be customized by a subscriber to fit the subscriber's personal needs. As shown, Homepage 900 includes messaging center 901 for sending and receiving e-mail via the Internet and intranet e-mail, a Communication Center 902 for selecting the method of communication—voice, fax, web or chat, etc., a header 903 with index installed that provides additional options such as Modify for customizing Homepage 900. Operator Service Menu inicludes Emergency Services 911 904 which permits utilizing the 911 emergency service via voice connection through Homepage 900. Advertisement 905 is an example of utilizing Homepage 900 for an additional revenue enhancing item. Personal Selections 906 is a list of general topics that may be modified by the subscriber and, in this instance includes subscriber business and personal URLs such as My Corporate Services 907, My News 908 and Chat Groups 910.

The present invention enables the wireless operator to capture revenues that may otherwise go to an ISP or Internet service, such as AOL. Even though the above described embodiment utilizes a wireless communication device, access to the operator's intranet is available to circuit based communication devices because of the IP structure. The web page may be a source of advertising revenue, previously unavailable to both wireline and wireless operators. By providing multiple connections to communication networks, including Public Switched Telecommunication Network (same as Public Circuit Network) and a web page providing an interface to an operator intranet and other non-operator associated links the operator utilizing the present invention improves the opportunity for additional revenues.

It is important to note that while the present invention has been described in the context of wireless and circuit networks utilizing programmed telecommunication devices, those skilled in the art will appreciate that the mechanism of the present invention is capable of being distributed in the form of an instruction bearing medium in a variety of forms and that the present invention applies equally, regardless of the particular type of signal bearing media utilized to actually carry out the distribution. Examples of instruction bearing media include: non-volatile, hard-coded type media such as read only memories (ROMs) or erasable, electronically programmable read only memories (EEPROMS), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for providing mobile-switching-centric intranet access to wireless devices within a given geographic location area uniquely served by a mobile switching center (MSC), said MSC establishing and switching connectivity between wireless devices within said given geographic location area and wireline network access points, said method comprising:

establishing packet-based communications between wireless devices within said given geographic location area and an intranet host server that includes processing and routing functionality for sharing information and data processing resources among wireless devices accessing said MSC, said establishing packet-based communications including:

responsive to receiving a device activation signal from a wireless device within said given geographic location area, determining whether said wireless device is a multimedia device; and responsive to determining that said wireless device is a multimedia device, establishing a network connection between said wireless device and said intranet host server.

2. The method of claim 1, wherein said establishing a network connection between said wireless device and said intranet host server includes transmitting an internet protocol homepage maintained by said intranet host server to a browser application within said wireless device.

3. The method of claim 1, wherein said establishing a network connection between said wireless device and said intranet host server is performed only in response to determining that said wireless device is a multimedia device.

4. The method of claim 1, wherein said device activation signal is a power-on signal or a location area update signal.

5. The method of claim 1, wherein said MSC facilitates mobile handoff for wireless devices traveling to or from said given geographic location area from or to other geographic location areas served by other MSCs.

6. The method of claim 1, wherein said given geographic location area consists of a plurality of geographically contiguous mobile access areas.

7. The method of claim 6, wherein each of said mobile access areas is a cell within a cellular telephony system.

8. A mobile-switching-centric intranet system, comprising:
 a mobile switching center (MSC) that provides switching connectivity between wireless devices within a given geographic location area uniquely associated with said MSC and wireline network access points;
 an intranet hosted by a server communicatively coupled to said MSC, wherein said intranet enables packet-based communications between wireless devices within said given geographic location area and said intranet host server;
 means responsive to receiving a device activation signal from a wireless device within said given geographic location area, for determining whether said wireless device is a multimedia device; and
 means responsive to determining that said wireless device is a multimedia device, for establishing a network connection between said wireless device and said intranet host server.

9. The mobile-switching-centric intranet system of claim 8, wherein said means for establishing a network connection between said wireless device and said intranet host server includes means for sending an internet protocol homepage maintained by said intranet host server to a browser application within said wireless device.

10. The mobile-switching-centric system of claim 8, wherein said means for establishing a network connection between said wireless device and said intranet host server is enabled only in response to determining that said wireless device is a multimedia device.

11. The method of claim 8, wherein said device activation signal is a power-on signal or a location area update signal.

12. The mobile-switching-centric intranet system of claim 8, wherein said MSC facilitates mobile handoff for wireless devices traveling to or from said given geographic location area from or to other geographic location areas uniquely associated with other MSCs.

13. The mobile-switching-centric system of claim 8, wherein said at least one intranet host server includes processing and routing functionality for sharing information and data processing resources among wireless devices accessing said MSC.

14. The mobile-switching-centric system of claim 8, wherein said given geographic location area consists of a plurality of geographically contiguous mobile access areas.

15. The mobile-switching-centric system of claim 14, wherein each of said mobile access areas is a cell within a cellular telephony system.

16. A program product for providing mobile-switching-centric intranet access to wireless devices within a given geographic location area uniquely served by a mobile switching center (MSC), said MSC establishing and switching connectivity between wireless devices within said given geographic location area and wireline network access points, said program product comprising:
 instruction means for establishing packet-based communications between wireless devices within said given geographic location area and an intranet host server that includes processing and routing functionality for sharing information and data processing resources among wireless devices accessing said MSC, said establishing packet-based communications including:
  instruction means responsive to receiving a device activation signal from a wireless device within said given geographic location area, for determining whether said wireless device is a multimedia device; and
  instruction means for responsive to determining that said wireless device is a multimedia device, establishing a network connection between said wireless device and said intranet host server.

17. The program product of claim 16, wherein said establishing a network connection between said wireless device and said intranet host server includes transmitting an internet protocol homepage maintained by said intranet host server to a browser application within said wireless device.

18. The program product of claim 16, wherein said establishing a network connection between said wireless device and said intranet host server is performed only in response to determining that said wireless device is a multimedia device.

19. The program product of claim 16, wherein said device activation signal is a power-on signal or a location area update signal.

20. The program product of claim 16, wherein said MSC facilitates mobile handoff for wireless devices traveling to or from said given geographic location area from or to other geographic location areas served by other MSCs.

21. The program product of claim 16, wherein said given geographic location area consists of a plurality of geographically contiguous mobile access areas.

22. The program product of claim 21, wherein each of said mobile access areas is a cell within a cellular telephony system.

* * * * *